US010853357B2

(12) United States Patent
Saeed et al.

(10) Patent No.: US 10,853,357 B2
(45) Date of Patent: Dec. 1, 2020

(54) EXTENSIBLE AUTOMATIC QUERY LANGUAGE GENERATOR FOR SEMANTIC DATA

(71) Applicant: University of Southern California, Los Angeles, CA (US)

(72) Inventors: Muhammad Rizwan Saeed, Los Angeles, CA (US); Charalampos Chelmis, Los Angeles, CA (US); Viktor K. Prasanna, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 609 days.

(21) Appl. No.: 15/701,160

(22) Filed: Sep. 11, 2017

(65) Prior Publication Data

US 2018/0075161 A1 Mar. 15, 2018

Related U.S. Application Data

(60) Provisional application No. 62/385,549, filed on Sep. 9, 2016.

(51) Int. Cl.
*G06F 16/242* (2019.01)
*G06F 16/36* (2019.01)
(Continued)

(52) U.S. Cl.
CPC ........ *G06F 16/2423* (2019.01); *G06F 16/242* (2019.01); *G06F 16/2428* (2019.01);
(Continued)

(58) Field of Classification Search
CPC . G06F 16/242; G06F 16/2423; G06F 16/2428
See application file for complete search history.

(56) References Cited

U.S. PATENT DOCUMENTS

| 10,621,166 B2 * | 4/2020 | Mittal | G06F 16/243 |
| 2013/0218899 A1 * | 8/2013 | Raghavan | G06F 16/156 707/741 |
| 2018/0276273 A1 * | 9/2018 | Mittal | G06F 40/30 |

OTHER PUBLICATIONS

Saeed, M.R., et al., "ASQFor: Automatic SPARQL Query Formulation for the Non-Expert", AI Communications vol. 31, No. 1, pp. 19-32, 2018.

(Continued)

*Primary Examiner* — William Spieler
(74) *Attorney, Agent, or Firm* — William N. Hughet; Melissa M. Hayworth; Jason M. Guerrero

(57) ABSTRACT

Systems and methods for querying a semantic data set are described. The semantic data set is defined by an ontology that represents a graphical relationship among data included in the semantic data set. One method includes receiving one or more keywords associated with a search operation from a user, and identifying a node associated with each of the one or more keywords. The method includes, for each identified node, tracing a path from the identified node to a root represented in the graphical relationship of the ontology, the path including one or more vertices, and identifying a lowest common ancestor of each of the vertices included in the paths for each identified node. The method includes constructing a subgraph connecting each identified node to the lowest common ancestor, and traversing the subgraph to generate a query in the query language executable against the semantic data set.

17 Claims, 18 Drawing Sheets

(51) Int. Cl.
G06F 16/2455 (2019.01)
G06F 16/901 (2019.01)
G06F 16/2452 (2019.01)

(52) U.S. Cl.
CPC .... *G06F 16/2455* (2019.01); *G06F 16/24522* (2019.01); *G06F 16/367* (2019.01); *G06F 16/9024* (2019.01)

(56) References Cited

OTHER PUBLICATIONS

Saeed, M.R., et al., Abstract: "Thou Shalt ASQFor and Shalt Receive the Semantic Answer", Proceedings of the Twenty Fifth International Joint Conference on Artificial Intelligence (IJCAI-16) www.ijcai.org/Abstract/16/652, Jul. 2016.

Saeed, M.R. et al., "Chapter 9—Automatic Integration and Querying of Semantic Rich Heterogeneous Data: Laying the Foundations for Semantic Web of Things", from Managing the Web of Things, Editor(s): Quan Z. Sheng, Yongrui Qin, Lina Yao, Boualem Benatallah, Elsevier, Morgan Kaufmann Publishers, Feb. 2017, pp. 251-273, ISBN 9780128097649.

* cited by examiner

FIG. 5

EXTENSIBLE AUTOMATIC QUERY LANGUAGE GENERATOR FOR SEMANTIC DATA

CROSS-REFERENCE TO RELATED APPLICATIONS

The present application claims priority from U.S. Provisional Patent Application No. 62/385,549, filed on Sep. 9, 2016, the disclosure of which is hereby incorporated by reference in its entirety.

TECHNICAL FIELD

The present disclosure relates generally to the field of data analysis, and particularly to the area of automatic query generation for semantic data.

BACKGROUND

As more and more semantic data become available on the Web, the question of how end users can access this body of knowledge becomes of crucial importance. Tools for creating, editing, and querying ontologies have been widely developed however accessing semantic data requires intimate familiarity with existing formal languages such as RDF and SPARQL. Such languages allow for querying of semantic data that may be dispersed across numerous, disparate data sets, with each query being useable to query that underlying data and presents results in a manner that preserves the ontological relationships among the data. Despite their strong expressive power, such formal languages impose an initial barrier to adoption due to their hard requirement for knowledge of formal syntax and understanding of the way knowledge is encoded in semantic repositories.

Existing semantic repositories utilize a Resource Description Framework (RDF) Semantic Web Standard for data organization. An RDF repository is a collection of triples, denoted as <subject, predicate, object>, and can be represented as a graph, the vertices of which denote subjects and objects, and edges denote predicates. SPARQL allows users to write queries against data repositories that follow the RDF specification of the World Wide Web Consortium (W3C) by creating queries that include of triples, conjunctions, disjunctions, and optional patterns. Although SPARQL is a standard way to access RDF data, it remains tedious and difficult for end-users because of the complexity of the SPARQL syntax and the RDF schema.

Furthermore, modern query languages for the Semantic Web do not readily support the handling of natural language text, requiring specialized solutions ranging from predefined templates which provide the skeleton for SPARQL queries to quasi natural language querying systems which rely on controlled vocabularies to guide the user step-by-step through the set of possible queries with suggestions of terms that are connected in the ontology. While such approaches make ontology queries more straightforward, they require expensive customization to each new domain or ontology; adding new templates requires the involvement of domain experts and language engineers. Furthermore, natural language interfaces are limited due to their adherence to specific syntactic or grammatical rules. Conversely, keyword-based search over hypertext documents is an established technology that is being used by search engines to capture users' complex information needs despite the fact that most queries include only of few words. In fact, search engines have become popular because of this simplistic conceptual model. Writing queries that require data related to multiple attributes, using natural language based querying interfaces, is tedious because it requires longer sentences and there are difficulties associated with parsing and interpreting natural language. Concept-based queries can be used to capture the information needs of a query using concise input and at the same time offering a search engine type interface to the end-user, but prior to the present invention, the formulation of such concept-based queries required intimate familiarity with the formal language for each data set to be queried.

SUMMARY

In accordance with the present disclosure, the above and other problems are solved by the following:

In a first aspect, a method for querying a semantic data set is described. The semantic data set is defined by an ontology that represents a graphical representation among data included in the semantic data set. One method includes receiving one or more keywords associated with a search operation from a user, and identifying a node associated with each of the one or more keywords. The method includes, for a pair of identified nodes, tracing a path from the identified nodes to a root represented in the graphical representation of the ontology and identifying the lowest common ancestor of both nodes. In the subsequent step using the next identified node (corresponding to the input keyword) and the computed lowest common ancestor (LCA) from the previous step, the new LCA is computed. The method includes constructing a query subgraph connecting each identified node to the lowest common ancestor, and traversing the subgraph to generate corresponding query statement in SPARQL which is executable against the semantic data set.

In a second aspect, a system for querying a semantic data set defined by an ontology that represents a graphical relationship among data included in the semantic data set is disclosed. The system includes a computing system comprising a processor and a memory operatively connected to the processor. The memory stores instructions executable by the processor that, when executed, cause the computing system to perform a method that includes receiving one or more keywords associated with a search operation from a user, and identifying a node associated with each of the one or more keywords. The method includes, for a pair of identified nodes, tracing a path from the identified nodes to a root represented in the graphical relationship of the ontology and identifying the lowest common ancestor of both nodes. In the subsequent step using the next identified node (corresponding to the input keyword) and the running lowest common ancestor (LCA) is updated by computing the new LCA of selected node and previous LCA. The method includes constructing a query subgraph connecting each identified node to the lowest common ancestor, and traversing the subgraph to generate corresponding query statement in SPARQL which is executable against the semantic data set.

In a third aspect, a non-transitory computer-readable storage medium is disclosed that includes computer-executable instructions stored thereon. When executed by a computing system, the instructions cause the computing system to perform a method comprising: receiving one or more keywords associated with a search operation from a user; identifying a node associated with each of the one or more keywords; identifying a lowest common ancestor of all the nodes corresponding to user-provided keywords; constructing a subgraph connecting each identified node to the lowest common ancestor; and traversing the subgraph to generate a query in the query language executable against the semantic data set.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 5 illustrates an example user interface that can be generated using the extensible automatic query language generator and query execution system for semantic data in association with the ontology shown in FIG. 4;

DETAILED DESCRIPTION

Figure 1:
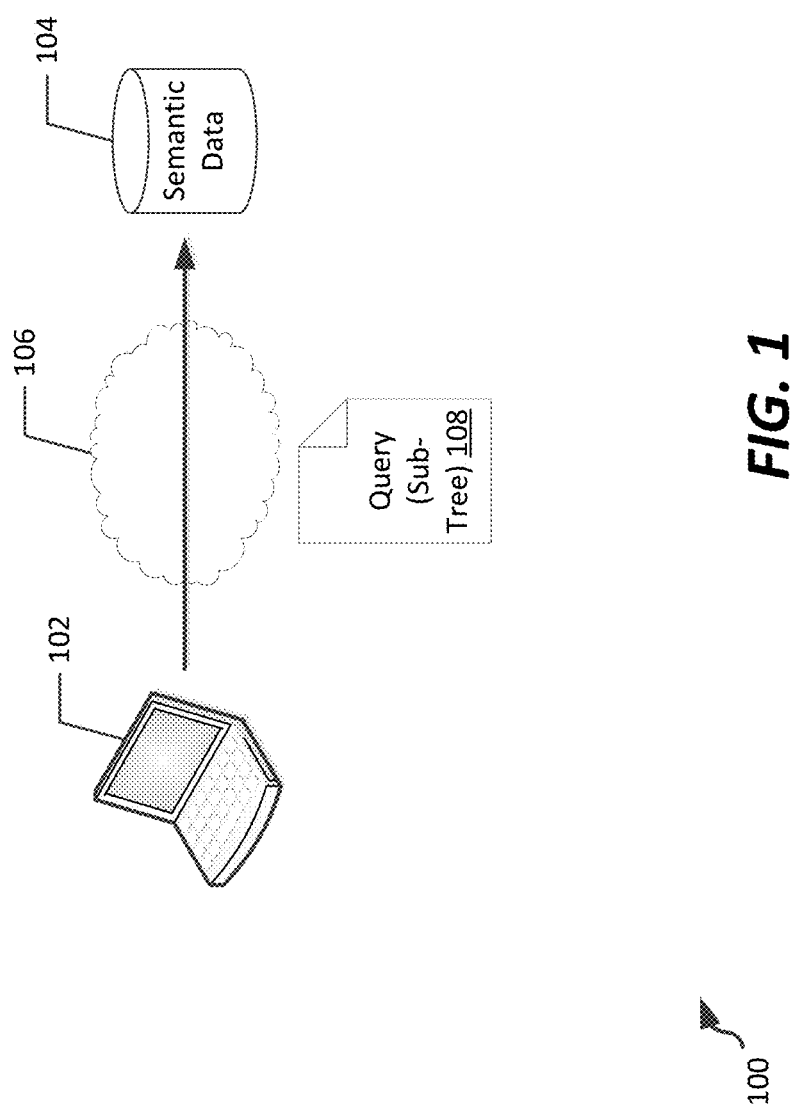
FIG. 1 illustrates an example system in which extensible automatic query generation may be performed.

As briefly described above, embodiments of the present invention are directed to systems and methods for automatic query language generator and query execution system for semantic data. The methods and systems described herein are particularly applicable in this context. However, numerous other possible applications are possible as well.

In the various embodiments discussed herein, the methods and systems described herein are specifically effective as relating to semantic data, and can generate queries without requiring a user to have detailed knowledge of how to query such ontological data. To automatically generate a SPARQL query suitable to query an ontology, a system would have to (i) separate the input into syntactic markers and "meaningful" tokens, (ii) map tokens to concepts in the ontology, (iii) link identified concepts based on relationships in the ontology, and (iv) issue the query to collect the results. Generally, and as discussed herein, a semantic repository that can be queried using the systems and methods of the present disclosure stores data using ontologies as semantic schema constructs. Such repositories allow for incorporation of numerous disparate data sources and querying against different types of schema constructs in terms of classes, object properties, and data properties while being oblivious to the actual structure of the semantic or ontological data. Semantic data sets, or repositories, include data stored using ontological models describing the metadata (meaning of data) that is also stored as part of the data set.

In various embodiments, the methods and systems of the present disclosure can be utilized in the context of data from the hydrocarbon industry, such as for searching and analysis of maintenance records, inspection records, sensor data, and other semantic data that can be searched for analysis. Other types of semantic data could be utilized in connection with the methods and systems described herein as well. Such data may be available as a single data set, or as multiple, disparate data sets having different underlying structures, whose relationship may be defined by one or more inter-linked ontologies that can be used to manage relationships among the data across such disparate data sets. Such disparate data sources can have different schemas and structures and are, once integrated, encoded using the Semantic Web standards of RDF and accessible through, e.g., a SPARQL endpoint.

In embodiments described herein, a <key,value> approach is taken to the problem of querying a semantic data repository. This Automatic SPARQL Query Formulation (ASQFor) framework is a reusable and extendable, domain-independent approach that requires virtually no end-user training to facilitate semantic querying over knowledge bases represented in RDF. ASQFor's simple and intuitive tuple-based interface accepts <key, value> inputs and translates them into a formal language query (currently SPARQL). Generated queries are then executed against the semantic repository and the result is returned to the user.

In accordance with the following disclosure, the ASQFor framework discussed herein provides a number of advantages with respect to query formulation and execution relative to existing query formulation systems, beyond the ability to provide a user interface for simple query formulation that was not previously available. In particular, the present framework reduces reliance on preprocessing data to provide information that is presented to the user through the user interface or otherwise used as part of query formulation. This avoids reliance on static dictionaries or preprocessed or predefined rules or queries that lack portability and/or require customization to a specific change in schema. To the contrary, the present framework receives data describing the data (or metadata) included in semantic data sources and exposes keywords within the user interface, and can generate queries based only on processing at the time of the query, given the set of ontological terms (metadata) exposed by the semantic repository through the SPARQL endpoint and selected by the user.

Furthermore, the present framework is domain independent, allowing for formulation of semantic queries in a way that does not rely on precomputed mapping of data sources and query rules and dictionaries but rather is dynamic. The input provided to the framework is the information contained within the ontologies of the semantic data sources themselves, rather than any additional computation. Accordingly, the user need only know the available information hosted and can formulate their search criteria in terms of key-value pairs consisting of relevant terms and filtering values.

Furthermore, and as discussed in a statistical analysis below, the query formulation process performed requires only limited overhead in terms of processing time to parse user inputs, create and/or update dictionaries, rules, or templates, and formulate the query. Still further, the query formulation described herein is substantially scalable with the size of the schema ontology.

FIG. 1 illustrates an example system useable to perform such a query. A computing system 102 is interfaced to a database 104 via a network 106, such as the internet. The computing system 102 can issue a query formed from a sub-graph 108 to the database 104 of semantic data and retrieve results accordingly. The database 104 is compatible with semantic query language SPARQL, providing a SPARQL endpoint for accessing it. A SPARQL endpoint is an interface providing access to one or more databases and can respond with results to queries issued using formal SPARQL syntax. The computing system 102 can then further process such results. It is noted that in the context of FIG. 1, database 104 is shown as a single data source containing semantic data; however, in example embodiments, multiple data sources could be used, having disparate structures, accessible through a SPARQL endpoint. In example embodiments, each database has a SPARQL endpoint with capability to expose ontological terms (metadata) and data to the computing system.

Figure 2:
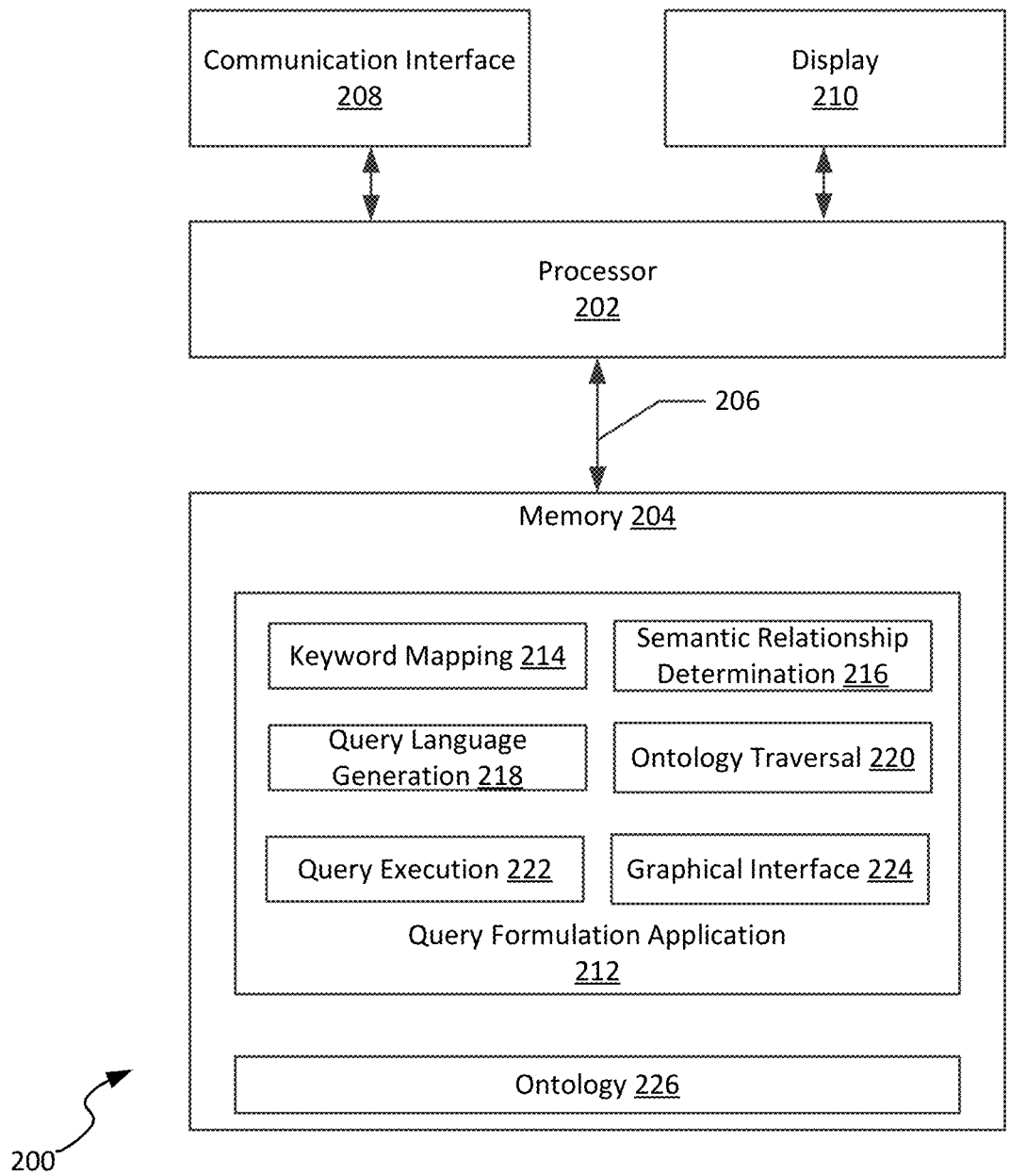
FIG. 2 illustrates a computing system useable to provide an extensible automatic query language generator and query execution system for semantic data, according to an example embodiment.

Referring now to FIG. 2, details regarding a computing system 200 useable to perform the automated query generation described herein is disclosed. The computing system 200 can be used, for example, as computing system 102 of FIG. 1.

In general, the computing system 200 includes a processor 202 communicatively connected to a memory 204 via a data bus 206. The processor 202 can be any of a variety of types of programmable circuits capable of executing computer-readable instructions to perform various tasks, such as mathematical and communication tasks.

The memory 204 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory 204 stores a query formulation application 212, discussed in further detail below. The computing system 200 can also include a communication interface 208 configured to receive and transmit data, for example to access data in an external database, such as database 104 of FIG. 1. Additionally, a display 210 can be used for viewing results of querying semantic web data via a query formulation application 212.

Figure 6:
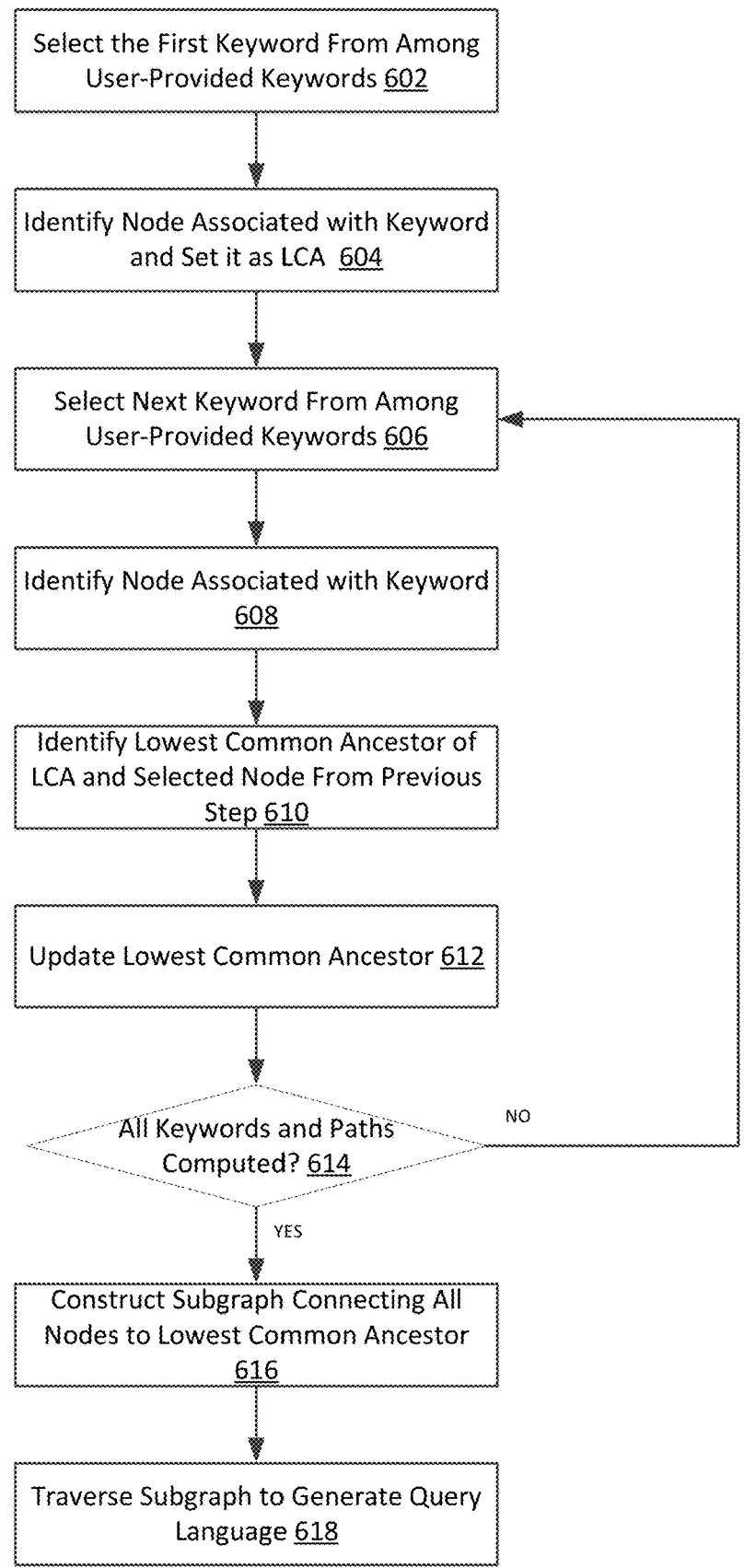
FIG. 6 illustrates an example process by which an ontology can be traversed to build a subgraph useable to generate a language-based query, according to an example embodiment.

In various embodiments, the query formulation application 212 allows a user to structure a query to a semantic data set. The query formulation application 212 exposes keywords for selection by a user, without requiring user knowledge of the underlying ontology or pre-computation of dictionaries or other structural features of the data sets. The query formulation application 212 includes a keyword mapping component 214, a semantic relationship determination component 216, a query language generation component 218, an ontology traversal component 220, a query execution component 222, and a graphical interface component 224. Details regarding such components are provided below in greater detail in connection with the execution of corresponding method steps as illustrated in FIGS. 3 and 6.

In the embodiment shown, the memory 204 can be configured to also store an ontology 226, which can represent the schema of semantic data that can be analyzed and traversed to build queries useable against such data. The ontology 226 can also be stored remotely with the semantic web data (on a different computing system hosting a database, such as database 104), or all such data can be stored locally.

Figure 3:
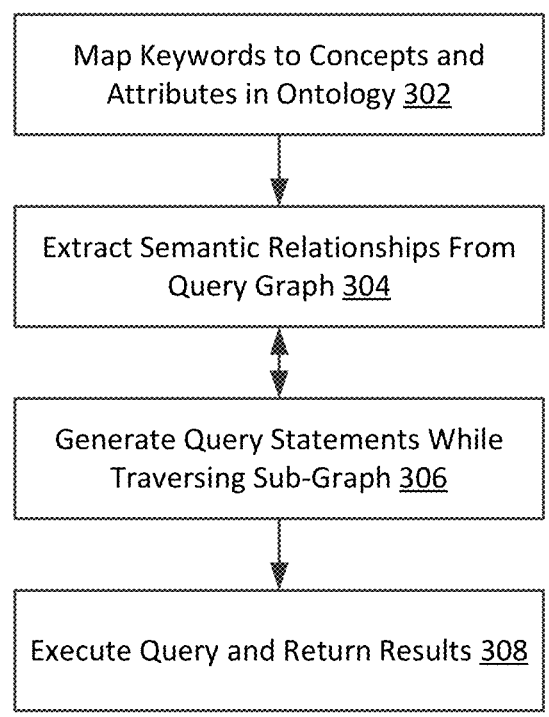
FIG. 3 illustrates an example flowchart of a method of automatically generating and executing queries for semantic data, according to an example embodiment.
Figure 4:
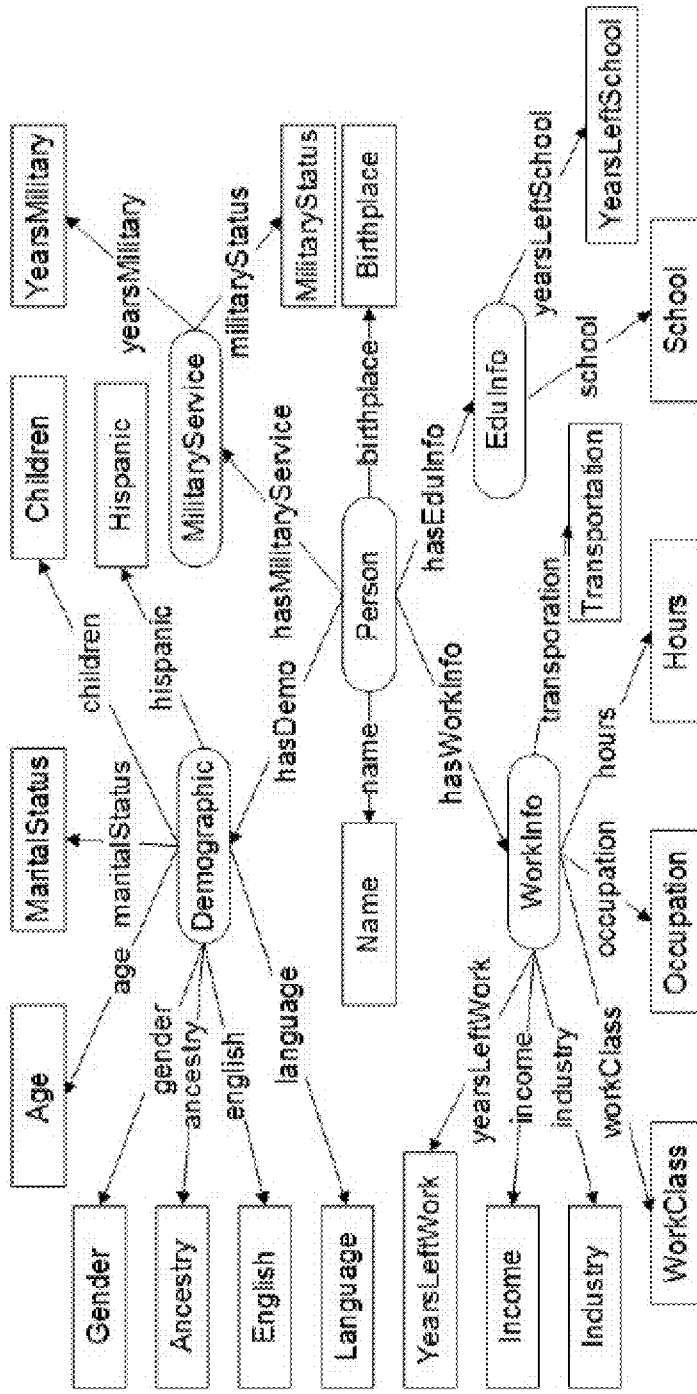
FIG. 4 illustrates an example ontology useable in association with semantic data, with which the extensible automatic query language generator and query execution system described herein can be utilized.

FIG. 3 illustrates an example flowchart of a method 300 of automatically generating and executing queries for semantic data, according to an example embodiment. In the example shown, the method 300 operates to generate SPAQRL queries in three main steps. First, user provided keywords are mapped to concepts and attributes in the ontology (step 302). For purposes of illustration, FIG. 4 illustrates an example ontology 400 useable in association with semantic data, with which the extensible automatic query language generator and query execution system described herein can be utilized. The ontology 400 generally represents a set of attributes for census data, which can be used in examples described herein.

In mapping keywords to concepts and attributes in FIG. 3, the users are exposed only to predicates they are familiar with (i.e., data they are looking for) while hiding technical details such as the database schema or the knowledge representation in the form of the ontology. For each keyword with a non-empty value (e.g., <language, English> in the running example of FIG. 4, below) a filtering SPARQL statement is generated that associates the keyword to the value in the form of a data property (e.g., ?language census: language "English"). An internal variable stores query variables (to be used in formulating SPARQL query) corresponding to classes and data properties in the ontology. This can also be used to keep track of subsumption relationships in the ontology. For instance, if attributes specific to a class and one or more of its super classes are relevant to the query, then the query variable corresponding to that class is used for generating query statements for its super classes.

Second, the semantic relations between concepts in the query are extracted (step 304), based on which a semantic query graph Q to model the query intention is built (step 306). Details regarding this step are provided in greater detail below in connection with FIG. 6. Finally, the SPARQL query is executed on the semantic repository and results are returned to the user (step 308).

Figure 5:
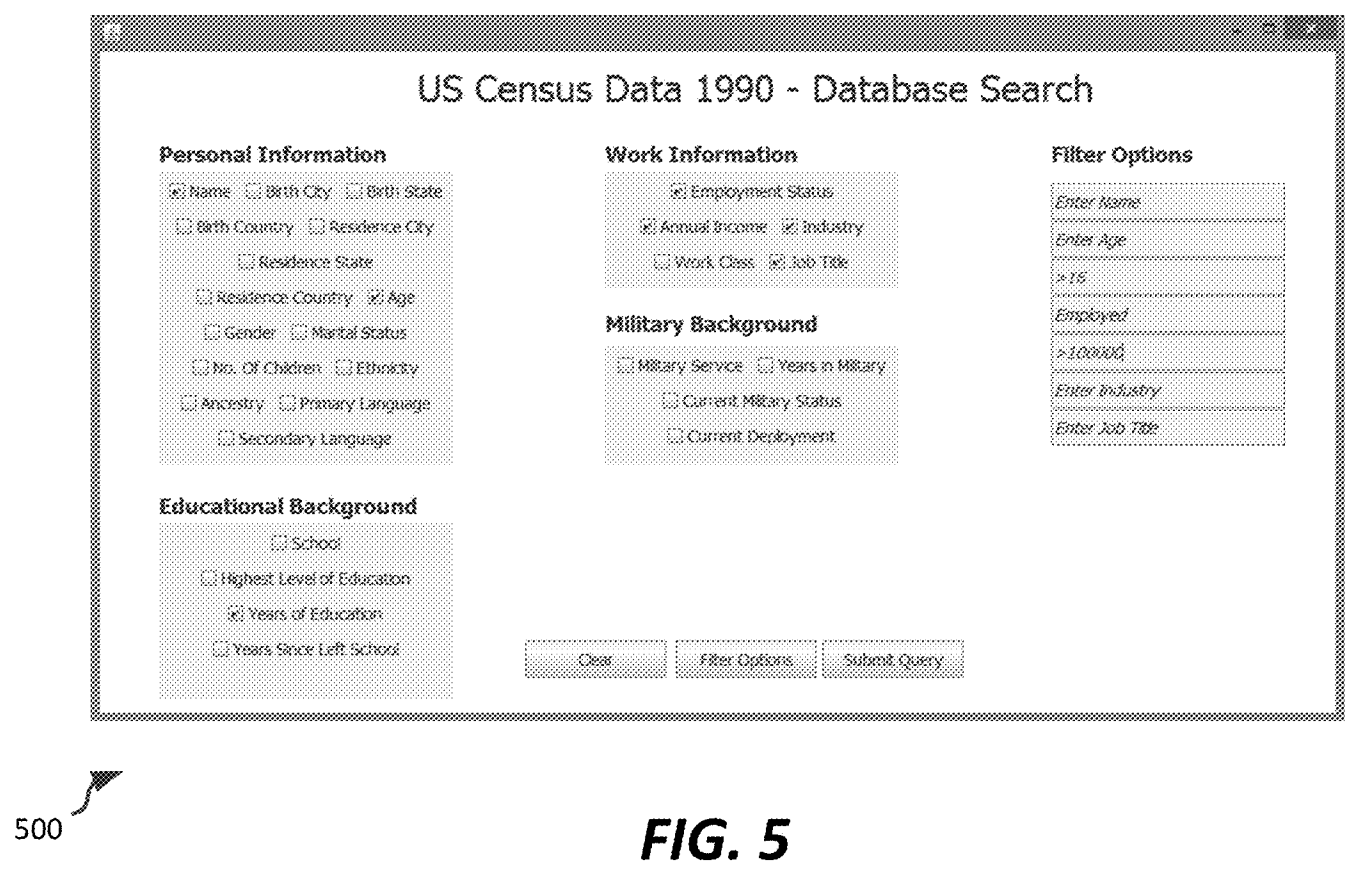

FIG. 5 illustrates an example user interface 500 that can be dynamically generated using the extensible automatic query language generator and query execution system for semantic data in association with the ontology shown in FIG. 4. The user interface 500 can be displayed on the computer 200 of FIG. 2, and presents one possible user input mechanism by which a user can select keywords for use in a query of semantic web data. In alternative embodiments, other user interfaces can be used as well, such as a search box interface. The keywords included in the user interface are obtained from the underlying semantic data structures (e.g., from a definition of each underlying structure), and can be provided at the time of generating the user interface or otherwise, such that the keywords are provided to the user on an as-needed basis, and to the extent underlying semantic data may change (and therefore keywords describing a structure of such data may change), the user interface 500 will automatically be updated, without requiring any further pre-processing or updating of data dictionaries. Accordingly, the framework described herein requires substantially less maintenance as underlying ontologies may change, and datasets included within such ontologies evolve.

In the embodiment shown, it can be seen that from the user's perspective, he only needs to know what kind of information is available in the database irrespective of how it is organized using ontological concepts and their interrelationships specified using object and data properties. This has led to a minimalist design which allows users to pick and choose the concepts that are relevant for the query, specify filtering values and get the desired result.

After selecting the required concepts, the user can click the FilterOptions to specify filtering values for individual concepts or leave them blank. The filtering values can be entered concatenated with comparison operators e.g. ≤500 etc. for range queries. After clicking SubmitQuery, the results are returned to the user, e.g., in a CSV format.

In example embodiments, the details of SPARQL and the schema ontology are hidden from the end user, providing him only the data attributes to choose from. Furthermore, this interface can be dynamically generated from a schema ontology, resulting in a portable application that only requires access to the semantic repository (which must contain schema ontology along with data triples) and builds a functional-to-SPARQL query translator and a GUI on the fly.

Although in some user interfaces a natural language search process might be employed, in the embodiment shown in FIG. 5, the keyword-based approach avoids some challenges of natural language searching, because in those systems, a pre-specified vocabulary or sentence structure may be required for a query, while still requiring parsing into some type of query that can be issued against the semantic data.

FIG. 6 illustrates an example process 600 by which an ontology can be traversed to build a smallest subgraph useable to generate a SPARQL query, according to an example embodiment. The process 600 can be used within the method 300 of FIG. 3, above. In the embodiment shown, the process 600 includes selecting the first user-provided (e.g., using the user interface 500 of FIG. 5) keyword (step 602), identifying the node associated with the keyword and set it as initial lowest common ancestor (LCA) (step 604). The process selects the next keyword (step 606) and identifies the node associated with that keyword (step 608) and computes new LCA of node selected in previous step and existing LCA (step 610). Example pseudocode for finding a lowest common ancestor of a pair of input classes, given the two classes and a root, can be represented as function ancestorOf(u;v) as follows:

```
Input: Two classes u and v in the Ontology, root of the
   schema Ontology
Output: The Lowest Common Ancestor of given two nodes
   u and v.
1: if u = v then
2:   return u
3: end if
4: pathToU ← list of nodes from root to u
5: pathToV ← list of nodes from root to v
6: i ← 1 to length(pathToU)
7: j ← 1 to length(pathToV)
8: while pathToU$_i$ == pathToV$_j$ and i ≤ length(pathToU) and
   j ≤ length(pathToV) do
9:   LCA ← pathToU$_i$
10:  i ← i + 1
11:  j ← j + 1
12: end while
13: return LCA
```

The process is repeated step by step with each remaining node and the LCA computed in the previous step until all keywords have been examined (step 614). If all keywords and paths are computed, a final lowest common ancestor of the vertices is selected (step 616), which essentially is the root of the query subgraph. The process 600 further includes traversing this subgraph to generate formal query that can be submitted, for example within the method 300 of FIG. 3 (step 618), as executed by a computing system as described in FIGS. 1-2. Example pseudocode for finding a lowest common ancestor of a set of input classes, given a set of classes and a root, can be represented as function findLCA (T) (which uses ancestorOf (u; v)) and depicted as follows:

```
Input: list T of classes, root of the schema Ontology
Output: The root of the query subgraph is computed which
is the Lowest Common Ancestor of all the classes in the
input list of classes.
 1: if length(T) = 1 then
 2:   return t1
 3: end if
 4: LCA ← t1
 5: for t_j ∈ T; j ←2 to length(T) do
 6:   u ← LCA
 7:   v ← t_j
 8:   if u = root or v = root then
 9:     return root
10:   else
11:     LCA ← ancestorOf (u;v)
12:   end if
13: end for
14: return LCA
```

Continuing the running example provided using the ontology of FIG. 4, each vertex u in graph Q is associated with an argument (i.e., key) and each edge $e_{uv}$ represents the relation between concepts u and v. A relationship between two arguments may be simple or complex, i.e., represented by a path of length greater than 1. A simple relationship is a triple <u, relation, v>, whereas a complex relationship might involve multiple triples with intermediate variables. To construct the semantic query graph Q, the lowest common ancestor r of all the vertices in the query is computed. This step is used to establish the smallest set of relationships between concepts and attributes in the query that lie on different branches of the RDF graph, such as attributes school and language in the example of FIG. 4.

The subgraph is then constructed that connects all nodes u to the root r of the query subgraph Q by tracing the path from each vertex u to r. The SPAQRL statement is being generated while traversing the subgraph to r by populating statements that correspond to semantic relations and intermediate nodes at each step. Specifically, ASQFor iterates through the list of unvisited class nodes, one at a time, marking each visited node at every iteration and classifying the current node as range of a user-defined object property, subclass of another class, or both. In the first and third cases, ASQFor traces the path towards r using the domain of the user-defined object property, and generates corresponding SPARQL statements using the current node, the object property of which is the range and domain of that object property.

When the current node is a subclass of another class, the query variable assigned to the current node is also assigned to its superclass. The process is repeated until r or a visited node is reached for a given keyword, after which the next keyword is selected and the process is repeated until all keywords are examined.

The pseudocode for a particular embodiment of the above example, ASQFor, is shown below:

```
Input: list L of key value pairs < K; V >
Output: SPARQL query Q that encapsulates the keywords provided by
the user and their semantic relationships that are represented by the
Ontology. In case values are provided, filtering statements are also
included to ensure the information need of the end-user is met.
 1: Q;varDictionary ← ∅
 2: for each key-value pair < k;v > ∈ L do
 3:   add variable for k in varDictionary
 4:   if k is a data property then
 5:     add variable for domain(k) in varDictionary
 6:   end if
 7:   if v = ∅ then
 8:     insert k in the query header
 9:   end if
10: end for
11: r ← findLCA(L)
12: for each key-value pair < k;v > ∈ L do
13:   if k is a data property then
14:     currentNode ← domain(k)
15:   else
16:     currentNode ← k
17:   end if
18:   while (currentNode.visited == 0 and
       currentNode ≠ r) do
19:     currentNode.visited = 1
20:     if ∃ triple < class, prop, currentNode > in G then
21:       class Var ← varDictionary.get(class)
22:       cNodeVar ← varDictionary.get(currentNode)
23:       Q ← insert triple < classVar, prop, cNodeVar >
24:     else
25:       if ∃ triple < currentNode; rdfs :subClassOf, class > in G then
26:         child Var ← varDictionary.get(currentNode)
27:         insert (or replace) pair (class,childVar) in varDictionary
28:       end if
29:     end if
30:     currentNode ← class
31:   end while
32:   if k is a data property then
33:     Q ← insert triple < domain(k), prop,k >
34:   if v ≠ ∅ then
35:     Q ← insert filter statement for k using v
36:   end if
37:   end if
38: end for
39: return Q
```

Figure 7:
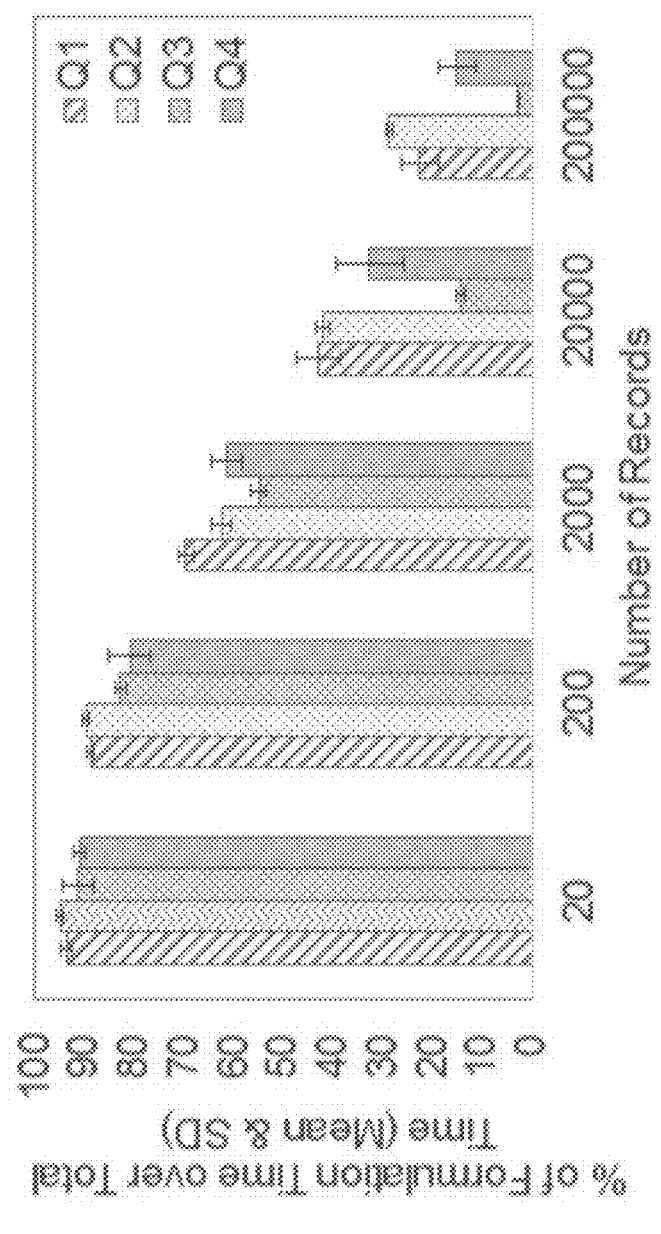
FIG. 7 illustrates a bar graph depicting a relationship between a number of records included in a semantic data set and the proportion of time used in an entire querying process to automatically generate the query language using different queries, according to an example implementation.

Referring to FIGS. 7-9, an example set of results are shown based on a set of evaluation queries useable to test the automated query generation described above. The set of results is based on the queries of Table 1, below.

TABLE 1

Evaluation Queries

| | |
|---|---|
| $Q_1$ | Name, birthplace, gender and marital status of all people on active military duty. |
| $Q_2$ | Occupations in different industries. |
| $Q_3$ | Names of people who attended private school. |
| $Q_4$ | All attributes for people born in California. |

The dataset used for the tests of FIGS. 7-9, for evaluation purposes, used the 1990 US Census data, which is provided in tabular format. The dataset contains 68 attributes for 2,458,285 individuals in total. For evaluation, this dataset was randomly sampled, selecting 1,000,000 entries and 20 attributes for each record. This dataset was then divided into 5 independent sets of size 200,000 triples each. The ontology of FIG. 4 was used for querying this data, with the data converted into RDF triples in a prepossessing step. The triples and ontology were stored in a triple store.

The queries generated using the automated query language generation tools of the present disclosure, to accomplish the evaluation queries of Table 1, are shown below in Table 2:

TABLE 2

Query Formulation for Representative Queries

| Queries | | $Q_1$ | $Q_2$ |
|---|---|---|---|
| Manual | | SELECT DISTINCT ?industry ?occupation WHERE { ?workinfo census:Industry ?industry. ?workinfo census:Occupation ?occupation.} | SELECT DISTINCT ?name ?school WHERE { ?person census:hasEducation> ?eduinfo. ?person census:Name> ?name, ?eduinfo census:School> "3".} |
| Functional | | <"Industry","">, <"Occupation", ""> | <"Name", "">, <"School", "3"> |
| ASQFor Generated | | SELECT DISTINCT ?industry ?occupation WHERE { ?workinfo census:Industry ?industry. ?workinfo census:Occupation ?occupation.} | SELECT DISTINCT ?name ?school WHERE {?person census:hasEducation> ?eduinfo. ?person census:Name> ?name. ?eduinfo census:School> ?school. FILTER ( ?school = "3" )} |

FIG. 7 illustrates a bar graph 700 depicting a relationship between a number of records included in a semantic data set and the proportion of time used in an entire querying process to automatically generate the query language using different queries, according to an example implementation. As seen in the bar graph 700, the mean and standard deviation of the ratio of formulation time to total time (formulation+execution) show that the formulation time on average takes ~90% of the total time execution times) for a dataset of size 20, whereas it accounts for <25% of the total time for a dataset of size 200,000 entries. Therefore, query formulation time becomes insignificant for large-scale semantic repositories.

Figure 8A:
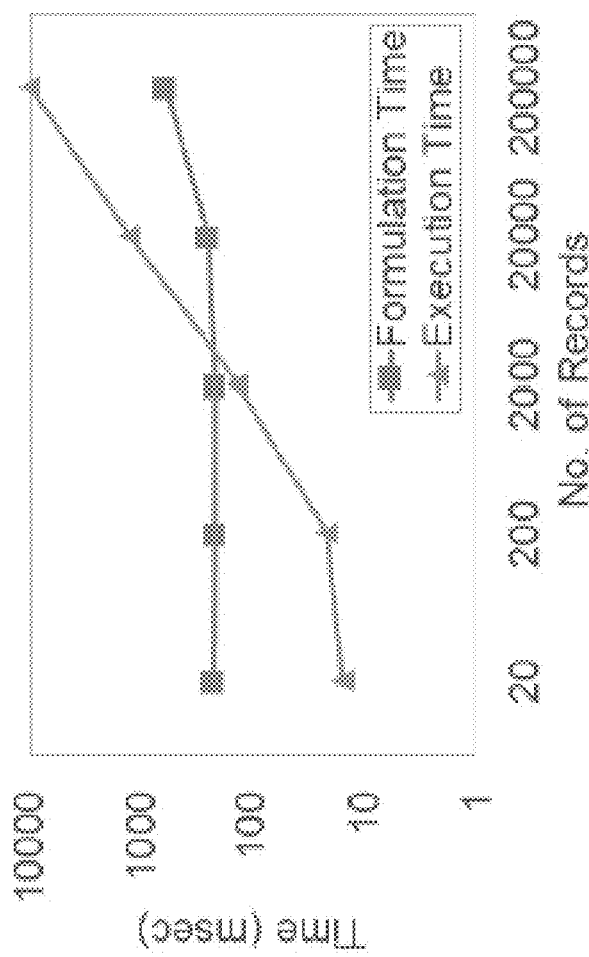
FIG. 8A illustrates a first line graph depicting a relationship between query formulation time and query execution time depending on the number of records included in a semantic data set, using a first query of the example discussed in connection with FIGS. 4-7.
Figure 8B:
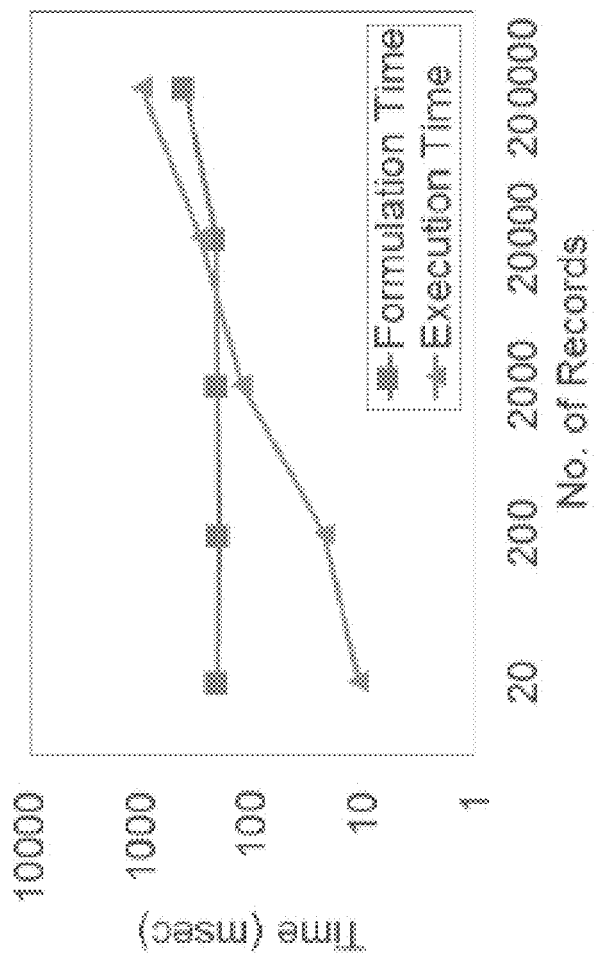
FIG. 8B illustrates a second line graph depicting a relationship between query formulation time and query execution time depending on the number of records included in a semantic data set, using a second query of the example discussed in connection with FIGS. 4-7.
Figure 8C:
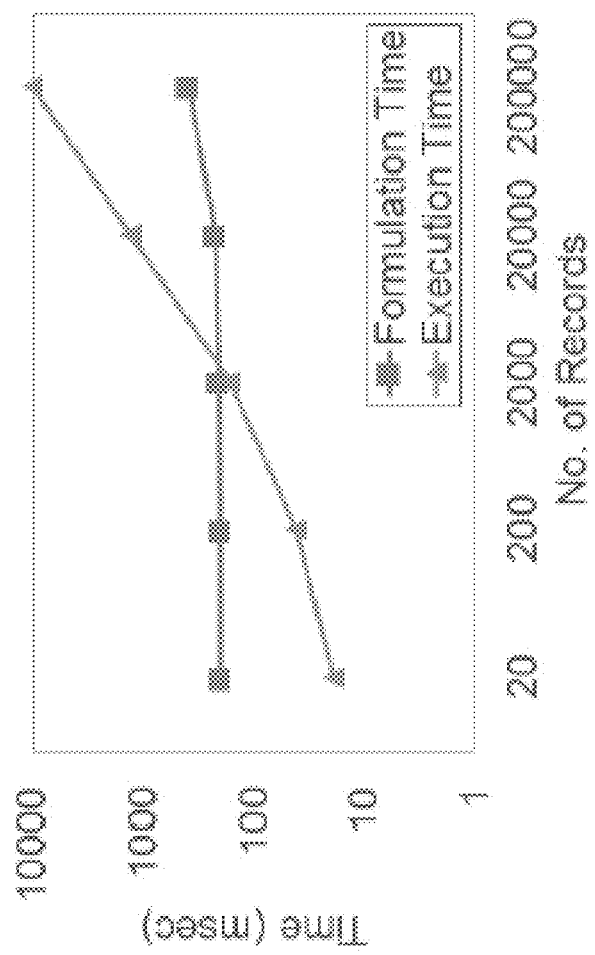
FIG. 8C illustrates a third line graph depicting a relationship between query formulation time and query execution time depending on the number of records included in a semantic data set, using a third query of the example discussed in connection with FIGS. 4-7.
Figure 8D:
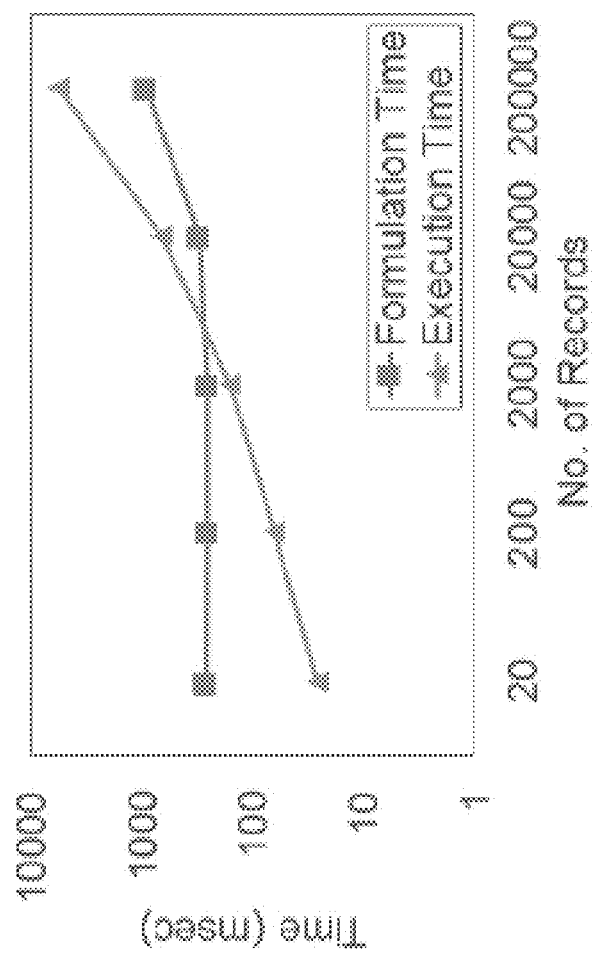
FIG. 8D illustrates a fourth line graph depicting a relationship between query formulation time and query execution time depending on the number of records included in a semantic data set, using a fourth query of the example discussed in connection with FIGS. 4-7.

This is reflected in FIGS. 8A-8D, which illustrate that the query generation component remains constant for different sample sizes. FIG. 8A illustrates a first line graph 800 depicting a relationship between query formulation time and query execution time depending on the number of records included in a semantic data set, using a first query ($Q_1$, of Table 1) of the example discussed in connection with FIGS. 4-7. Similarly, FIG. 8B illustrates a second line graph 810 depicting a relationship between query formulation time and query execution time depending on the number of records included in a semantic data set, using a second query ($Q_2$, of Table 1). FIG. 8C illustrates a third line graph 820 depicting a relationship between query formulation time and query execution time depending on the number of records included in a semantic data set, using a third query ($Q_3$, of Table 1). FIG. 8D illustrates a fourth line graph 830 depicting a relationship between query formulation time and query execution time depending on the number of records included in a semantic data set, using a fourth query ($Q_4$, of Table 1).

As seen in FIGS. 8A-8D, the overhead of ASQFor for query formulation is constant, whereas execution time varies as a function of the size of the result set and the size of the repository. In fact, query formulation time is significant as compared to query execution time only when the repository is substantially small (i.e., less than 2,000 entries). As expected, with increasing repository size, query execution time surpasses query formulation time.

Figure 9A:
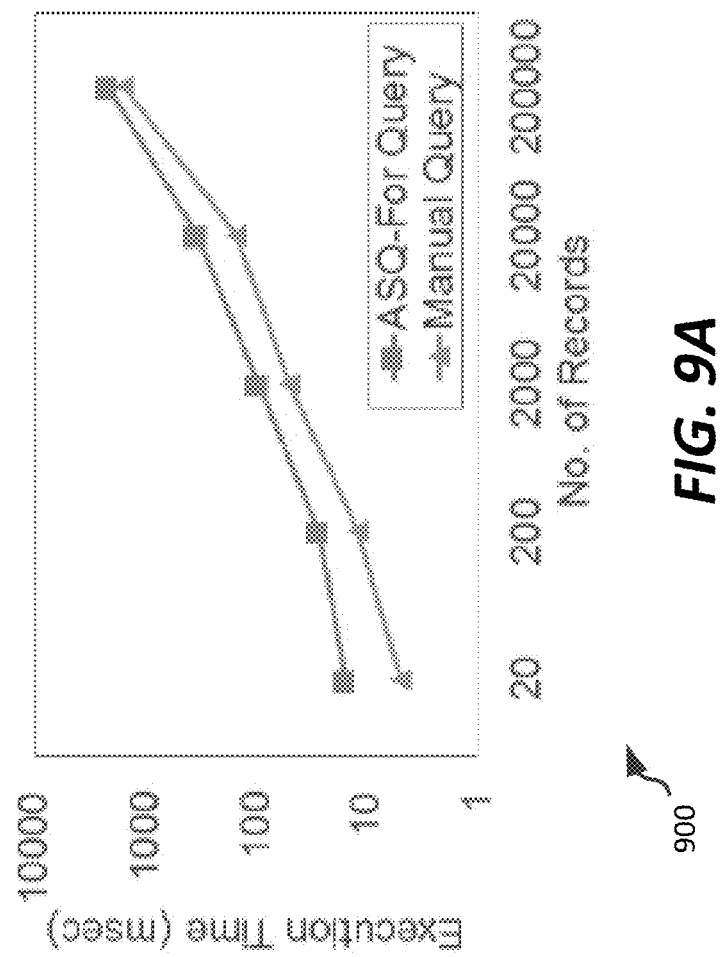
FIG. 9A illustrates a first line graph depicting a relationship between total query time using automated query language generation and using manual query language generation, depending on the number of records included in a semantic data set, using a first query of the example discussed in connection with FIGS. 4-7.
Figure 9B:
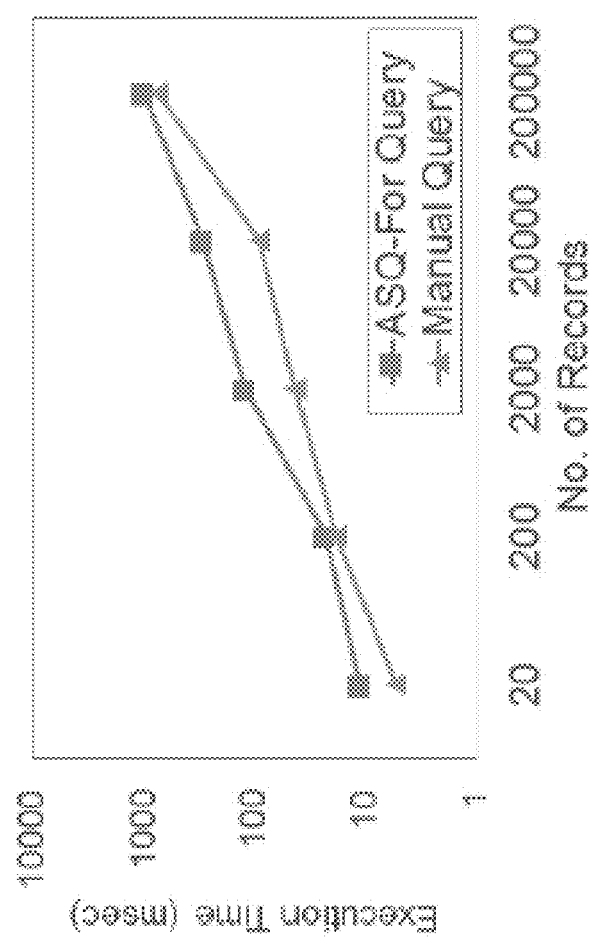
FIG. 9B illustrates a second line graph depicting a relationship between total query time using automated query language generation and using manual query language generation, depending on the number of records included in a semantic data set, using a second query of the example discussed in connection with FIGS. 4-7.
Figure 9C:
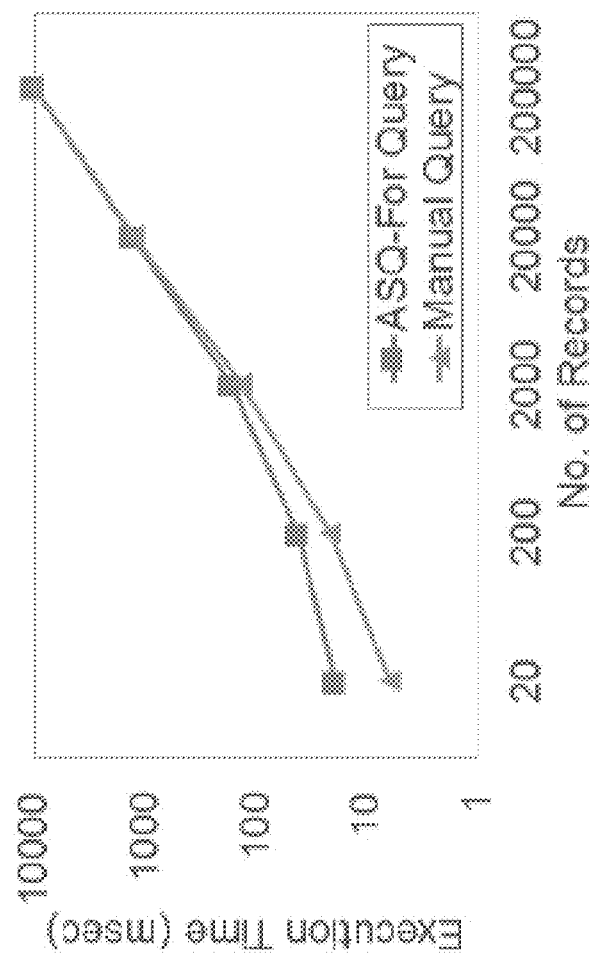
FIG. 9C illustrates a third line graph depicting a relationship between total query time using automated query language generation and using manual query language generation, depending on the number of records included in a semantic data set, using a third query of the example discussed in connection with FIGS. 4-7.
Figure 9D:
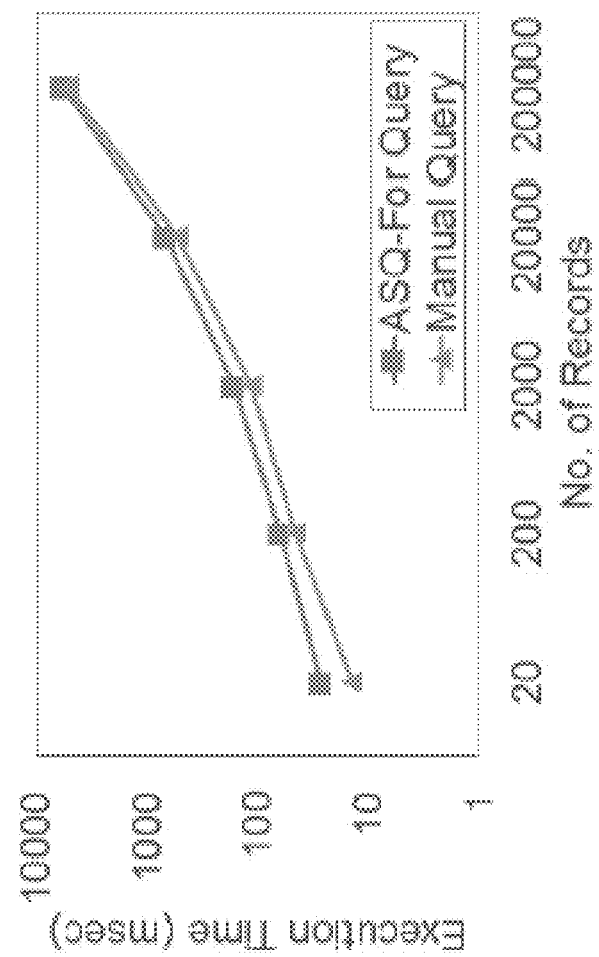
FIG. 9D illustrates a fourth line graph depicting a relationship between total query time using automated query language generation and using manual query language generation, depending on the number of records included in a semantic data set, using a fourth query of the example discussed in connection with FIGS. 4-7.

Referring to FIGS. 9A-9D, line graphs show a relationship between total query time in the case of automated query generation and manual query generation using data sets of increasing size. In particular, FIG. 9A illustrates a first line graph 900 depicting a relationship between total query time using automated query language generation and using manual query language generation, depending on the number of records included in a semantic data set, using a first query ($Q_1$, of Table 1) of the example discussed in connection with FIGS. 4-7. FIG. 9B illustrates a second line graph 910 depicting a relationship between total query time using automated query language generation and using manual query language generation, depending on the number of records included in a semantic data set, using a second query ($Q_2$, of Table 1). FIG. 9C illustrates a third line graph 920 depicting a relationship between total query time using automated query language generation and using manual query language generation, depending on the number of records included in a semantic data set, using a third query ($Q_3$, of Table 1). FIG. 9D illustrates a fourth line graph 930 depicting a relationship between total query time using automated query language generation and using manual query language generation, depending on the number of records included in a semantic data set, using a fourth query ($Q_4$, of Table 1).

In particular, FIGS. 9A-9D show the average response time calculated over the 5 sets in our dataset for each of the four queries in Table 1. For most queries the difference between the execution time of manual and automatic queries is insignificant for practical purposes. In fact, ASQFor adds only little overhead as compared to the manually optimized queries, particularly as the size of the dataset increases. On some queries (e.g., $Q_3$) ASQFor seems to match the run time of the manual query even for smaller datasets.

Figure 10:
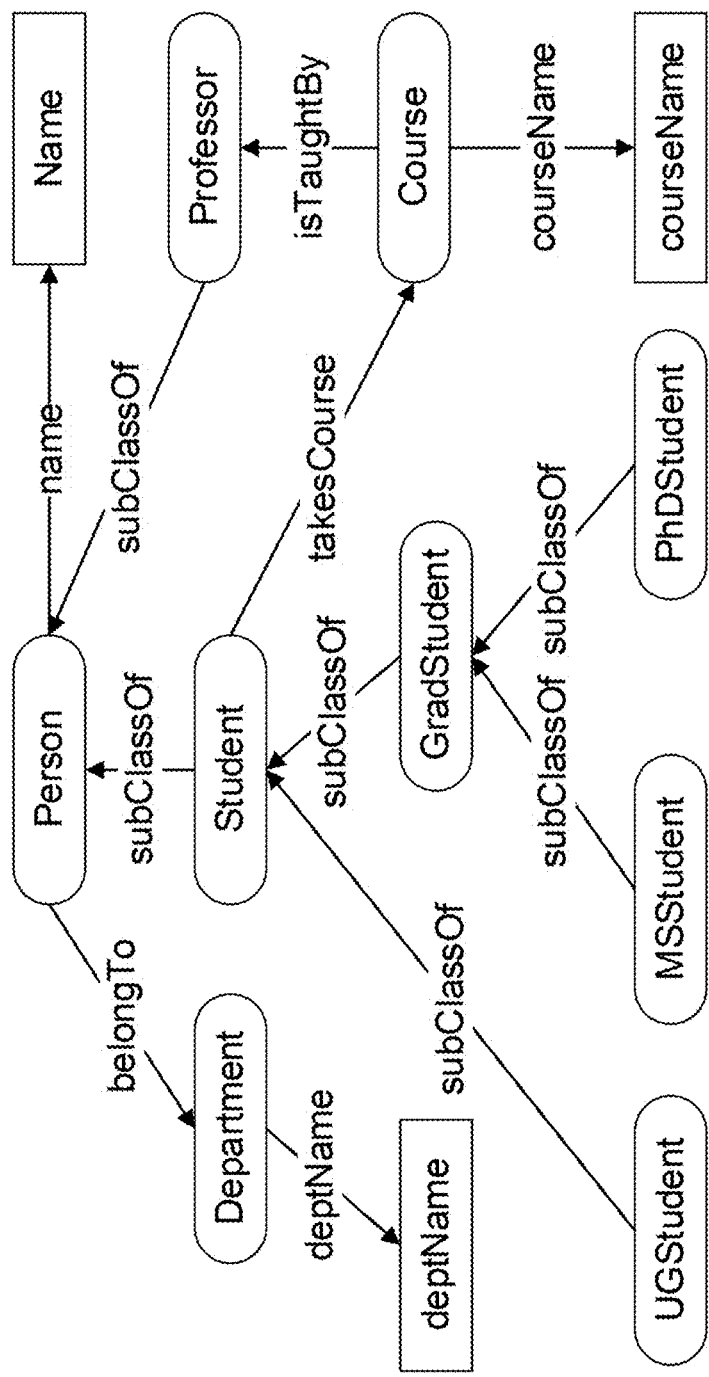
FIG. 10 illustrates a further example ontology useable in association with semantic data, with which the extensible automatic query language generator and query execution system described herein can be utilized.
Figure 11:
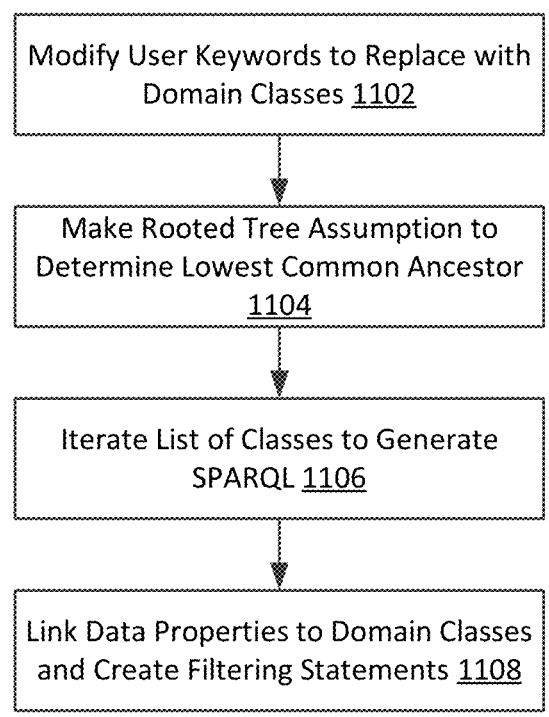
FIG. 11 illustrates a further illustration of an example process for formulating a query of ontological data.
Figure 12:
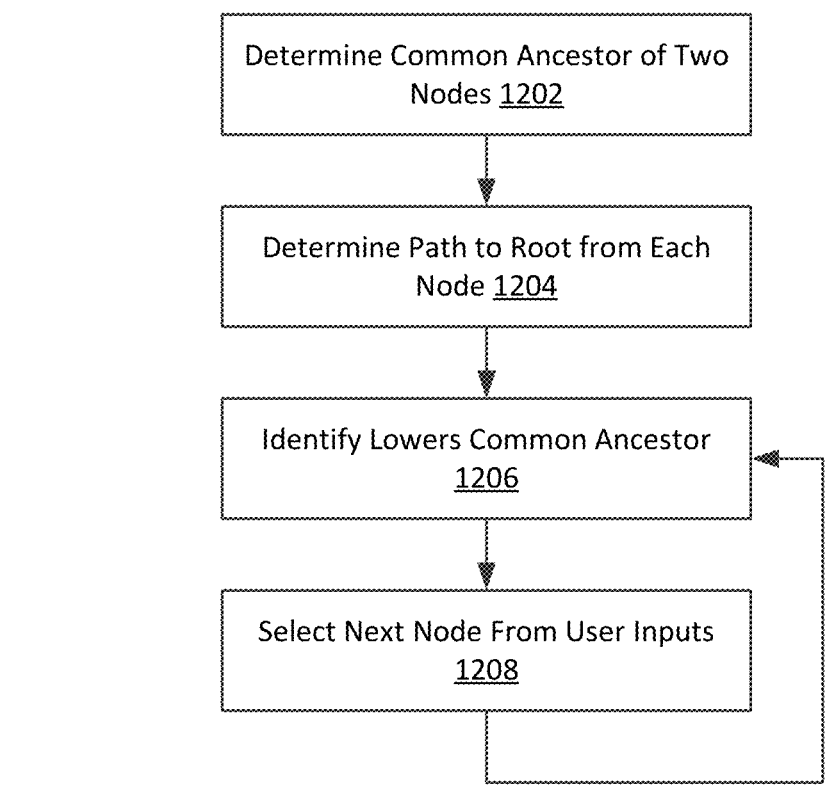
FIG. 12 illustrates a further example process for identifying a least common ancestor among nodes to be included in a query during formulation

Referring now to FIGS. 10-12, further detail regarding an example query formulation process according to the present disclosure is shown in conjunction with a further example ontology. The example ontology 1000 seen in FIG. 10 is useable in association with semantic data, with which the extensible automatic query language generator and query execution system described herein can be utilized. The ontology 1000 illustrates structured, categorized data for persons associated with a university.

FIG. 11 illustrates a high-level example process flow 1100 for generating query language that can be applied against ontological data in accordance with the following disclosure. A user-provided list of keywords is modified to allow all attributes to be replaced with domain classes (step 1102). In this step, an input being the uniform resource identifier (URI) of a data property is received, and a URI of a domain class is issued. A root of the schema is assumed to be unique, and determinable with a single SPARQL query; as such, a path from each class to the root is traced to compute a lowest common ancestor (LCA) of all the domain classes in the modified input list (step 1104). The process 1100 then proceeds to iterate through the list of classes that are identified in step 1102 (step 1106); in each iteration, a node is selected from the list, marked as visited, and it is determined whether the currently selected node is in a range of a user-defined object property, subclass, or both; the path toward a subroot is traced using the domain of the identified object property, and SPARQL statements are generated using the current node, the object property, and domain. Step 1106 can be repeated until either the root or a previously visited node is reached; at that point, the next keyword is selected from the modified input list for processing. Once complete, data properties are linked to respective domain classes through SPARQL statements and filtering statements are made (step 1108). The filtering statements and linked domain classes are used to generate SPARQL statements that can be propagated to a semantic data set.

Referring to FIG. 12, the lowest common ancestor (LCA) can be determined by first determining a common ancestor of two nodes (step 1202), and then a path from the each of two inputs to the root are computed (step 1204). A lowest common ancestor is determined (step 1206), and then a next node can be selected from user inputs (step 1208) with the process repeated for that next node relative to the current lowest common ancestor. Once complete, a subgraph for a particular query is determined.

By way of example, and referring to FIGS. 10-12, the ontology 1000 can be queried using a keyword-based query. For purposes of illustration, a keyword-based query such as <Name, *>, <GradStudent, *>, <Professor, *>, <courseName, "CS570" > can be used.

The targets of the query are different concepts and attributes that lie on different branches of the graph 1000, e.g., the attributes name and courseName and the classes Grad-Student and Professor. Specifically, name is an attribute of Person which is the superclass of both GradStudent and Professor. courseName is an attribute of class Course, which is related to the concepts Professor and GradStudent through properties isTaughtBy and takesCourse respectively.

In performing the query formulation process described herein, initially, all the data properties (name and course-Name) are resolved to their respective domains (Person and Course, respectively), as in step 302 of FIG. 3, of step 1102 of FIG. 11. The modified input list of keywords then contains: Person, GradStudent, Professor, and Course, where each entry is of type Class.

In order to establish the relationship between these nodes, the smallest subgraph Q that connects the nodes is identified. This can be performed, for example, by finding the lowest common ancestor of the selected nodes as described in Steps 602-610 of FIG. 6, or steps 1202-1206 of FIG. 12. This becomes a root node of the query subgraph Q. In this example, the subgraph root and root are the same, i.e. Person.

Once the subgraph root is identified, the system will iterate through with further keywords (e.g., in steps 1206-1208 of FIG. 12). In the first iteration, Person was selected, and no further processing is performed because that is the root of the query subgraph. In a next iteration, GradStudent is selected, and it is subsequently determined that GradStudent is a subclass of another class, i.e., Student. A variable for the subclass GradStudent is assigned (e.g., ?gradstudent) to class Student, and a SPARQL statement generated relevant to this class in the current iteration will use the variable ?gradstudent. Using Student, Course is the next-selected node in the path to the root; using Student, Course and their linking property takesCourse, the algorithm generates a SPARQL statement, such as:

1. ?gradstudent university:takesCourse ?course.
2. ?course university:isTaughtBy ?professor.
3. ?professor university:name ?professorname.
4. ?gradstudent university:name ?gradstudentname.
5. ?course university:courseName ?coursename.

As seen above, ?gradstudent is used for Student. Furthermore, with Course as the current node, the next node on path to the root is Professor through the object property isTaughtBy. Hence, statement 2 above is generated. With Professor as the next selected node, it is determined that it is the subclass of Person. The update of variable dictionary occurs as before, however, no new statement will be generated for Person in this iteration as it is the root of the query subgraph.

For the next class nodes Professor and Course in the input list, no statements are generated as these classes have already been visited. This completes the process of generating statements for all classes relevant to the query.

Finally, the data properties in the unmodified input list are iterated through (name and courseName in this example). Since name can be associated with multiple classes i.e., GradStudent and Professor, the algorithm assigns different query variables to name, resulting in statements 3 and 4 above. The domain of data property courseName is Course, which leads to the generation of statement 5. In the final step, after applying filters based on nonempty values from the list of key-value pairs, a final query is formulated as shown below:

```
SELECT DISTINCT ?gradstudent ?professor
?professorname ?gradstudentname ?coursename
WHERE {
?gradstudent rdf:type univeristy:GradStudent.
?professor rdf:type university:Professor.
?professor university:name ?professorname.
?gradstudent university:name ?gradstudentname.
?gradstudent university:takesCourse ?course.
?course university:courseName "CS570".
}
```

In further examples, other database structures defining other types of ontologies can be used. In conjunction with such ontologies different queries can be performed to query different types of data, and computing systems may be configured to generate different outputs in response. For example, and as noted above, in an industrial context, different types of equipment management processes can be managed using SPARQL querying across semantic data sets that include multiple, disparate data sources. In such instances, the data sets can be queried to determine different characteristics of industrial machinery for purposes of performing integrity and/or reliability studies or monitoring operations. In further examples, data sets for reservoir management can be combined and analyzed, with different sources including wellbore data, seismic data, and other types of captured reservoir data being combinable using such querying.

In a particular example, efficient access to semantic data through ASQFor can allow drilling engineers to focus more on analyzing the acquired semantic data to provide improved accuracy in predicting risks of specific drilling events occurring, instead of spending time in just accessing data from disparate data sources. This is accomplished, for example, by querying two different semantic data sources that have been integrated: drilling and completions data from a drilling-specific application, and well design and completion data captured using a separate application and database. This allows for analysis on discrete data points (e.g., points in time or specific sub-processes) rather than having to assess unstructured text data and manually combining such data to perform such an analysis.

Further description of the present query formulation framework is provided in Saeed et al., ASQFor: Automatic SPARQL Query Formulation for the Non-Expert (publication pending in Journal Of AI Communications), the disclosure of which is hereby incorporated by reference in its entirety.

Referring generally to the systems and methods of FIGS. 1-9, above, and referring to in particular computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 500, above. Computer storage media does not include a carrier wave or other propagated or modulated data signal. In some embodiments, the computer storage media includes at least some tangible features; in many embodiments, the computer storage media includes entirely non-transitory components.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A method of generating a query capable of being performed on a semantic data set defined by an ontology that represents a graphical relationship among data included in the semantic data set, the method comprising:
   receiving one or more keywords associated with a search operation from a user;
   identifying a node associated with each of the one or more keywords;
   identifying a lowest common ancestor of all the nodes corresponding to user-provided keywords;
   constructing a subgraph connecting each identified node to the lowest common ancestor; and
   traversing the subgraph to generate a query in the query language executable against the semantic data set.

2. The method of claim 1, further comprising receiving input from the user at a graphical user interface identifying one or more keywords that are included in the ontology.

3. The method of claim 2, wherein a structure of the semantic data set is obscured to the user.

4. The method of claim 1, further comprising executing the query against the semantic data set.

5. The method of claim 1,
   wherein generating the query in the query language occurs at a first time; and further comprising:
   receiving, at a second time, a second one or more keywords associated with a second search operation from the user, the second search operation occurring after a change in an ontology relative to a state in which the search operation is performed.

6. The method of claim 5, further comprising, as part of the second search operation:
   identifying a node associated with each of the second one or more keywords;
   identifying a lowest common ancestor of all the nodes corresponding to second user-provided keywords;
   constructing a subgraph connecting each identified node to the lowest common ancestor; and
   traversing the subgraph to generate a second query in the query language executable against the semantic data set.

7. The method of claim 1, wherein the semantic data set comprises a plurality of disparate data sources.

8. A system for querying a semantic data set defined by an ontology that represents a graphical relationship among data included in the semantic data set, the system comprising:
   a computing system comprising:
      a processor; and
      a memory operatively connected to the processor, the memory storing instructions executable by the processor that, when executed, cause the computing system to perform a method comprising:
         receiving one or more keywords associated with a search operation from a user;
         identifying a node associated with each of the one or more keywords;
         identifying a lowest common ancestor of all the nodes corresponding to user-provided keywords;
         constructing a subgraph connecting each identified node to the lowest common ancestor; and
         traversing the subgraph to generate a query in the query language executable against the semantic data set.

9. The system of claim 8, wherein the computing system further comprises a database stored in the memory, the database storing the semantic data set.

10. The system of claim 9, wherein the one or more keywords are received at a fielded user interface generated by the computing system from the semantic data set.

11. The system of claim 8, wherein the semantic data set comprises a plurality of disparate data sources.

12. The system of claim 8, wherein the query is generated without receiving query language from the user.

13. The system of claim 8, wherein the computing system is further configured to execute the query against the semantic data set.

14. The system of claim 13, further comprising, in response to executing the query, outputting results of the query to a user interface.

15. The system of claim 14, wherein the semantic data set describes an industrial process, and wherein the system is further configured to, in response to executing the query, generate a prediction of an event associated with the industrial process.

16. The system of claim 8, wherein a structure of the semantic data set is obscured to the user.

17. A non-transitory computer-readable storage medium comprising computer-executable instructions stored thereon which, when executed by a computing system, cause the computing system to perform a method comprising:
receiving one or more keywords associated with a search operation from a user;
identifying a node associated with each of the one or more keywords;
identifying a lowest common ancestor of all the nodes corresponding to user-provided keywords;
constructing a subgraph connecting each identified node to the lowest common ancestor; and
traversing the subgraph to generate a query in the query language executable against the semantic data set.

* * * * *